(12) United States Patent
Wu et al.

(10) Patent No.: US 11,178,624 B2
(45) Date of Patent: Nov. 16, 2021

(54) METHOD OF ADJUSTING TRANSMISSION POWER OF TERMINAL, MOBILE TERMINAL, AND STORAGE DEVICE

(71) Applicant: HUIZHOU TCL MOBILE COMMUNICATION CO., LTD., Huizhou (CN)

(72) Inventors: Zhaoyun Wu, Huizhou (CN); Huixin Wang, Huizhou (CN); Yan Fang, Huizhou (CN); Weilong Zhou, Huizhou (CN); Zilong He, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 137 days.

(21) Appl. No.: 16/821,987

(22) Filed: Mar. 17, 2020

(65) Prior Publication Data
US 2020/0221397 A1 Jul. 9, 2020

Related U.S. Application Data

(63) Continuation of application No. PCT/CN2018/106254, filed on Sep. 18, 2018.

(30) Foreign Application Priority Data

Sep. 18, 2017 (CN) .......................... 201710846737.9

(51) Int. Cl.
*H04B 17/318* (2015.01)
*H04W 52/36* (2009.01)
(Continued)

(52) U.S. Cl.
CPC ....... *H04W 52/367* (2013.01); *H04W 52/146* (2013.01); *H04W 52/241* (2013.01); *H04W 52/245* (2013.01)

(58) Field of Classification Search
CPC ............ H04W 72/0473; H04W 52/146; H04W 52/367; H04W 52/283; H04W 72/1226;
(Continued)

(56) References Cited

U.S. PATENT DOCUMENTS

2008/0299927 A1* 12/2008 Tenbrook .............. H04W 48/16
455/226.2
2013/0178240 A1   7/2013 Kiyomoto
2014/0126391 A1   5/2014 Liu et al.

FOREIGN PATENT DOCUMENTS

CN         1968035 A      5/2007
CN       101854710 A     10/2010
(Continued)

OTHER PUBLICATIONS

First Office Action from Chinese patent office in a counterpart Chinese patent Application 201710846737.9, dated Mar. 19, 2020 (8 pages).
(Continued)

*Primary Examiner* — Tu X Nguyen

(57) ABSTRACT

The present application provides a method of adjusting transmission power of a terminal, a mobile terminal, and a non-transitory storage device, and relate to the field of mobile terminals. The method includes: connecting to an accession point of a wireless network; obtaining a connection state of the terminal connecting to the accession point; calculating a connection evaluation score based on the connection state; obtaining a state of a screen, setting a threshold connection score based on the state of the screen; comparing the connection evaluation score to the threshold connection score; and reducing the transmission power of the terminal connecting to the wireless network in response to the connection evaluation score being greater than the threshold connection score.

20 Claims, 3 Drawing Sheets

(51) Int. Cl.
*H04W 52/14* (2009.01)
*H04W 52/24* (2009.01)

(58) Field of Classification Search
CPC ... H04W 76/25; H04B 17/318; H04M 1/0202
See application file for complete search history.

(56) References Cited

FOREIGN PATENT DOCUMENTS

| | | | |
|---|---|---|---|
| CN | 101925167 A | 12/2010 | |
| CN | 101951671 A | 1/2011 | |
| CN | 102833838 A | 12/2012 | |
| CN | 104113899 A | 10/2014 | |
| CN | 104427538 A | 3/2015 | |
| CN | 104981005 A | 10/2015 | |
| CN | 105636138 A | 6/2016 | |
| CN | 106412343 A | 2/2017 | |
| CN | 106453909 A | 2/2017 | |
| CN | 106658652 A | 5/2017 | |
| CN | 107659987 A | 2/2018 | |
| GB | 2356967 A | 6/2001 | |
| GB | 2448367 B | 9/2009 | |
| WO | WO2014166249 A1 | 10/2014 | |

OTHER PUBLICATIONS

International search report for PCT/CN2018/106254, dated Dec. 10, 2018 (2 pages).
The second search report,201710846737.9, dated Sep. 30, 2020 (5 pages).
The supplementary european search report,18856597.2, dated Dec. 10, 2020 (9 pages).

* cited by examiner

METHOD OF ADJUSTING TRANSMISSION POWER OF TERMINAL, MOBILE TERMINAL, AND STORAGE DEVICE

CROSS-REFERENCE TO RELATED APPLICATIONS

The present application is a continuation-application of International (PCT) Patent Application No. PCT/CN2018/106254, filed on Sep. 18, 2018, which claims foreign priority of Chinese Patent Application No. 2017108467379, filed on Sep. 18, 2017 in the National Intellectual Property Administration of China, the entire contents of which are hereby incorporated reference in their entireties.

TECHNICAL FIELD

The present disclosure relates to the field of mobile terminals, and in particular to a method of adjusting transmission power of a terminal, a mobile terminal, and a non-transitory storage device.

BACKGROUND

As mobile terminals continuously develop, users may access an internet to work, for entertaining, or the like, via a wireless network more frequently. However, battery capacity of the mobile terminals in the art may be limited, and, with the limited battery capacity, time that the users spend on accessing the internet via the wireless network may be limited, impacting user experience.

SUMMARY OF THE DISCLOSURE

According to a first aspect of the present disclosure, a non-transitory storage device is configured to store program data, the program data able to be executed to perform operations of: connecting to an accession point of a wireless network; obtaining a connection state of a terminal connecting to the accession point; calculating a connection evaluation score based on the connection state; obtaining a state of a screen of the terminal, setting a threshold connection score based on the state of the screen; comparing the connection evaluation score to the threshold connection score; and reducing transmission power of the terminal connecting to the wireless network in response to the connection evaluation score being greater than the threshold connection score. Obtaining a connection state of a terminal connecting to the accession point comprises obtaining a connection speed, a loss rate, and an interference degree of the terminal connecting to the accession point. The calculating a connection evaluation score based on the connection state comprises: calculating the connection evaluation score based on a score calculation formula, and the score calculation formula is expressed as the connection evaluation score=a connection speed×0.7/(the loss rate×0.2+the interference degree×0.1). Obtaining the interference degree of the terminal connecting to the accession point comprises: obtaining a channel type of the accession point connected to the terminal and signal strength values of all accession points of a channel having the accession point connected to the terminal; and obtaining the interference degree by calculating the signal strength values based on a computing strategy corresponding to the channel type.

According to a second aspect of the present disclosure, a method of adjusting transmission power of the terminal is provided and includes: connecting to an accession point of a wireless network; obtaining a connection state of the terminal connecting to the accession point; calculating a connection evaluation score based on the connection state; obtaining a state of a screen, setting a threshold connection score based on the state of the screen; comparing the connection evaluation score to the threshold connection score; and reducing the transmission power of the terminal connecting to the wireless network in response to the connection evaluation score being greater than the threshold connection score.

According to a third aspect of the present disclosure, a mobile terminal is provided and includes a processor and a non-transitory memory. The processor is coupled with the non-transitory memory, and the processor is arranged to perform operations of: connecting to an accession point of a wireless network; obtaining a connection state of the terminal connecting to the accession point; calculating a connection evaluation score based on the connection state; obtaining a state of a screen, setting a threshold connection score based on the state of the screen; comparing the connection evaluation score to the threshold connection score; and reducing the transmission power of the terminal connecting to the wireless network in response to the connection evaluation score being greater than the threshold connection score.

BRIEF DESCRIPTION OF THE DRAWINGS

To further illustrate technical solutions of embodiments of the present disclosure more clearly, drawings for the embodiments will be briefly described hereinafter. Obviously, the drawings described in the following are some embodiments of the present disclosure. To any one of skill in the art can obtain other drawings based on the following drawings without any creative work.

DETAILED DESCRIPTION

Figure 1:
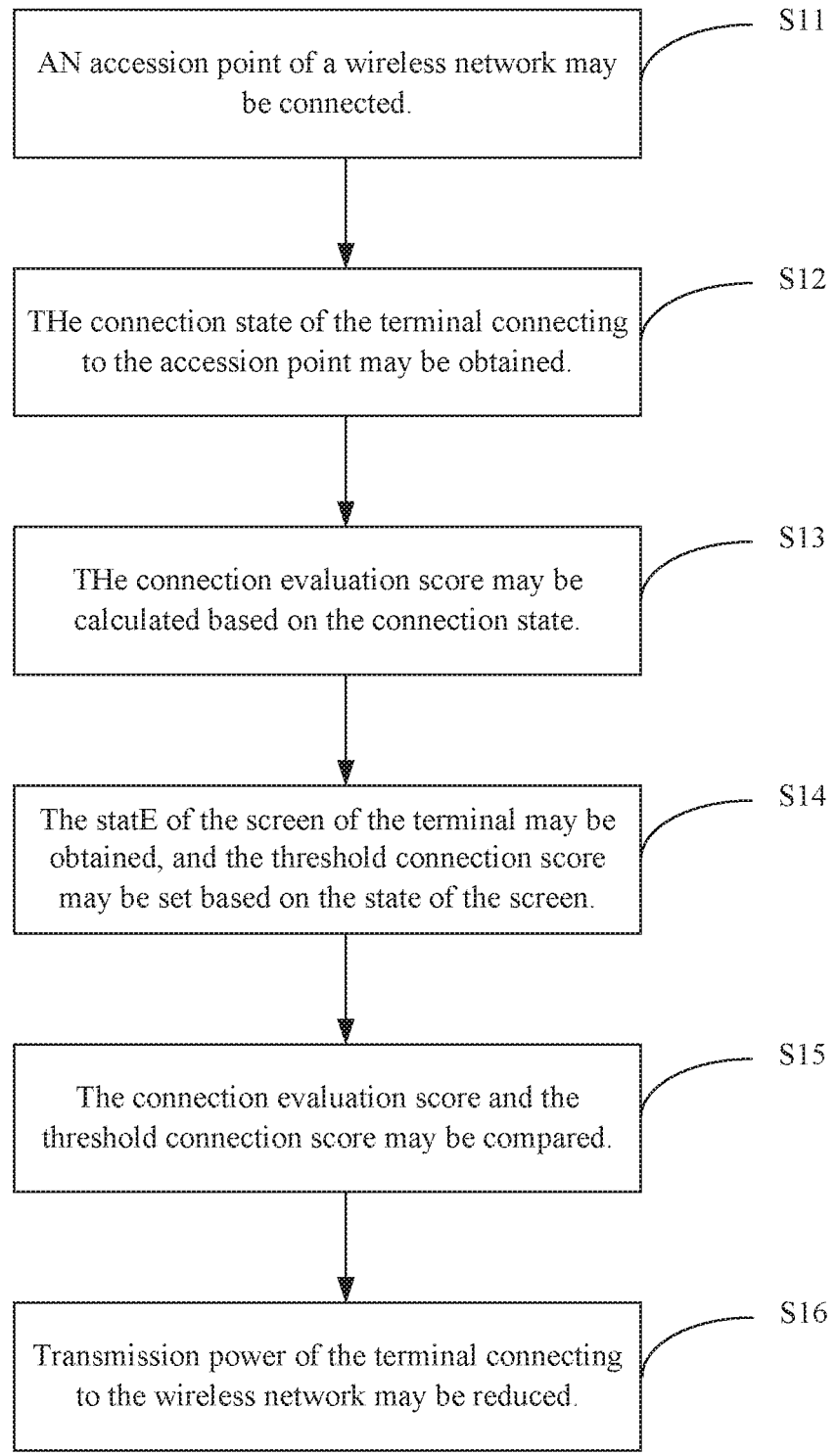
FIG. 1 is a flow chart showing a method of adjusting transmission power of a terminal according to an embodiment of the present disclosure.

Technical solutions of the embodiments of the present disclosure may be illustrated clearly and comprehensively by referring to the drawings of the embodiments. It may be understood that described specific embodiments are for the purpose of explaining the present disclosure, but not to limit the scope of the present disclosure. It may be noted that, to provide a concise description, only a part of structures related to the present disclosure, but not all structure, are shown in the drawings. Based on the embodiments of the present disclosure, other embodiments obtained by any one of skill in the art without creative work should be within the scope of the present disclosure.

A mobile terminal provided in the present disclosure may include an electronic device such as a smart mobile phone, a tablet computer, an intelligent wearable device, a digital audio and video player, an electronic reader, a portable game machine, and the like.

Terms of "first", "second", and "third" used in the present disclosure are for the purpose of illustrating, and shall not be regarded as implying or indicating significance or the number of a technical feature. Therefore, a feature defined by the "first", the "second", and the "third" may indicate or imply inclusion of at least one of the feature. In the description of the present disclosure, "a plurality of" indicates at least two, such as two, three, and the like. In addition, terms of "include", "comprise", and other transformation thereof intend to express non-exclusive inclusion. For example, a process, a method, a system, a product, or a device including a series of operations or units is not limited to listed operations and units, unlisted operations and units may alternatively be included, or other inherent operations or units for the process, the method, the product, or the device may alternatively be included.

"Embodiment" mentioned in the present disclosure may indicate that certain characteristics, structures, or properties described by referring to the embodiment may be included in at least one embodiment of the present disclosure. The term of "embodiment" at various sections of the present disclosure may not refer to a same embodiment, and may not be an independent or alternative embodiment conflicting with other embodiments. Any one of skill in the art should explicitly or implicitly understand that embodiments described in the present disclosure may be combined with other embodiments.

As shown in FIG. 1, a flow chart showing a method of adjusting transmission power of a terminal is provided. In the present embodiment, the method of adjusting transmission power of the terminal may include following operations.

In an operation of S11, an accession point of a wireless network may be connected to the terminal.

The wireless network may be a network achieved via wireless communication. The wireless network may include a global voice and data network allowing a user to establish a long-range wireless connection, and include a network using an infrared technology and a radio frequency technology optimizing a short-range wireless connection. The wireless network and a wired network may have a similar application, and the wireless network and the wired network may involve different transmission media. A radio replaces a wire to achieve the wireless network, and each of the wireless network and the wired network may be a backup for each other. The wireless network that is widely used may include a wireless network achieved via a public-land mobile network (such as 3G, 4G, or General Packet Radio Service) and via a wireless local area network (such as Wireless-Fidelity, WiFi). The wireless network in the present embodiment may refer to the wireless local area network.

The accession point of the wireless network may refer as a "hotspot". A device of the accession point of the wireless network may include an integral device having routing switch and accession and a device purely for accession. The integral device may perform operations of accessing and routing, and the device purely for accession may enable a client to access only. The device purely for accession may be applied as a wireless network extender and connect with other accession points of the wireless network or a main accession point of the wireless network to extend a range covered by the wireless network, whereas the integral device may typically be a core of the wireless network. In the present embodiment, the accession point of the wireless network may refer to the device purely for accession arranged at home or in a public area.

In the operation of S11, the accession point of the wireless network may be connected to the terminal. Specifically, during the user is daily using the mobile terminal, activities, such as working, entertaining, socializing, and the like, may be performed by accessing an internet. The internet may be accessed via WiFi, that is, a function of the terminal for connecting to the WiFi may be activated (for example, a switch for WiFi connection may be switched on), a list of WiFi accession points found by the mobile terminal may be acquired, and an accession point expected for connection may be selected. The accession point of the wireless network connected in the operation of S11 may be used for a following operation S12 to obtain a connection state.

In an operation of S12, the connection state of the terminal connecting to the accession point may be obtained.

After connecting to the accession point of the wireless network as described in the operation of S11, the connection state of the terminal connecting to the accession point may be obtained in the operation of S12. The connection state of the terminal connecting to the accession point may include attribute information of the accession point. The accession point may be analyzed accordingly by obtaining the connection state of the terminal connecting to the accession point. Typically, whether the connection state is good may be analyzed after obtaining the connection state of the accession point. For example, when the connection state is not good, the user may be reminded that a current connection state of the accession point is relatively poor, and the terminal may increase transmission power of the terminal to obtain more signals, increasing power consumption and reducing time period for which the terminal may run. When the connection state is good, the transmission power may remain unchanged. In the present embodiment, the transmission power of the terminal may be adjusted appropriately based on the connection state, such that the power consumption may be reduced. The connection state of the accession point obtained in the operation of S12 may be used for calculating a connection evaluation score in a following operation S13.

In the operation of S13, the connection evaluation score may be calculated based on the connection state.

In the operation of S13, the connection evaluation score may be calculated based on the connection state of the terminal connecting to the accession point obtained in the operation of S12. Specifically, the connection evaluation score may be used to evaluate a current state of the accession point, such as strength of a connection signal, a speed of transmission, and the like. The connection evaluation score may be calculated based on relative information extracted from the connection state of the accession point, and a formula for calculating the connection evaluation score may be determined by a programming personnel. In the present embodiment, after the connection evaluation score is calculated, an operation of S14 may be performed, that is, a state of a screen of the terminal may be obtained, and a threshold connection score may be set based on the state of the screen. The connection evaluation score calculated in the operation of S13 may be used in an operation of S15 for comparing with the threshold connection score obtained in the operation S14.

In the operation of S14, the state of the screen of the terminal may be obtained, and the threshold connection score may be set based on the state of the screen.

After the connection evaluation score is calculated based on the connection state in the operation of S13, the operation of S14 may be performed to obtain the state of the screen and set the threshold connection score corresponding to the state of the screen. Specifically, the state of the screen may impact the connection state of the terminal. For example, when the user is using the terminal to watch a video, a connection state with a strong connection signal and a high transmission speed may be required to ensure the user to use the terminal normally. When the user is using the terminal for socializing, communication may typically be performed via voice information or text information, and a connection state having a connection signal in medium strength and a medium transmission speed may be required to ensure the user to use the terminal normally. When the user is not using the terminal, connection to the internet is to prevent from missing reminding information sent from an application, under such a situation, the user may use the terminal normally, as long as the connection signal is available (i.e., no particular requirement for the strength of the connection signal) and a relatively low speed of transmission may be required. Therefore, the threshold connection score may be various corresponding to various states of the screen. In the operation of S15, the threshold connection score set based on the state of the screen as described in the operation of S14 may be adapted to compare to the calculated connection evaluation score obtained in the operation of S13.

In the operation of S15, the connection evaluation score and the threshold connection score may be compared.

In the operation of S15, the connection evaluation score calculated in the operation of S13 and the threshold connection score set based on the state of the screen in the operation of S14 may be compared. In response to the connection evaluation score being greater than the threshold connection score, a following operation of S16 may be performed. In response to the connection evaluation score being less than or equal to the threshold connection score, no operations may further be performed.

In the operation of S16, transmission power of the terminal connecting to the wireless network may be reduced.

After determining the connection evaluation score being greater than the threshold connection score in the operation of S15, the operation of S16 may be performed to reduce the transmission power of the terminal connecting to the wireless network. The transmission power of the terminal connecting to the wireless network may be reduced in a stepwise manner or by reducing a same value periodically. For example, a stepwise reduction may refer to reducing 5 db each time in a first stage, reducing 1 db each time in a second stage, and reducing 0.1 db each time in a third stage; and a periodic reduction may refer to reducing 5 db every 5 seconds.

It may be noted that, in the present embodiment, the operations of S12 to S16 may be performed repeatedly. That is, after each reduction of the transmission power of the terminal connecting to the wireless network, the operations of S12 to S15 may be performed again, and that is, the connection evaluation score obtained after each reduction of the transmission power of the terminal and the threshold connection score may be compared again. In response to the connection evaluation score being greater than the threshold connection score, the operation of S16 may be performed again, and no operations may further be performed until the connection evaluation score is less than or equal to the threshold connection score.

According to the present embodiment, the accession point of the wireless network may be connected, the connection state of the terminal connecting to the accession point may be acquired, the connection evaluation point may be calculated based on the connection state, the state of the screen of the terminal may be obtained, the threshold connection score may be set based on the state of the screen, and the connection evaluation score may be compared to the threshold connection score. In response to the connection evaluation score being greater than the threshold connection score, the transmission power of the terminal connecting to the wireless network may be reduced, such that the user may use the mobile terminal to access the internet via the wireless network for an extended period of time with limited battery capacity, improving user experience.

Figure 2:
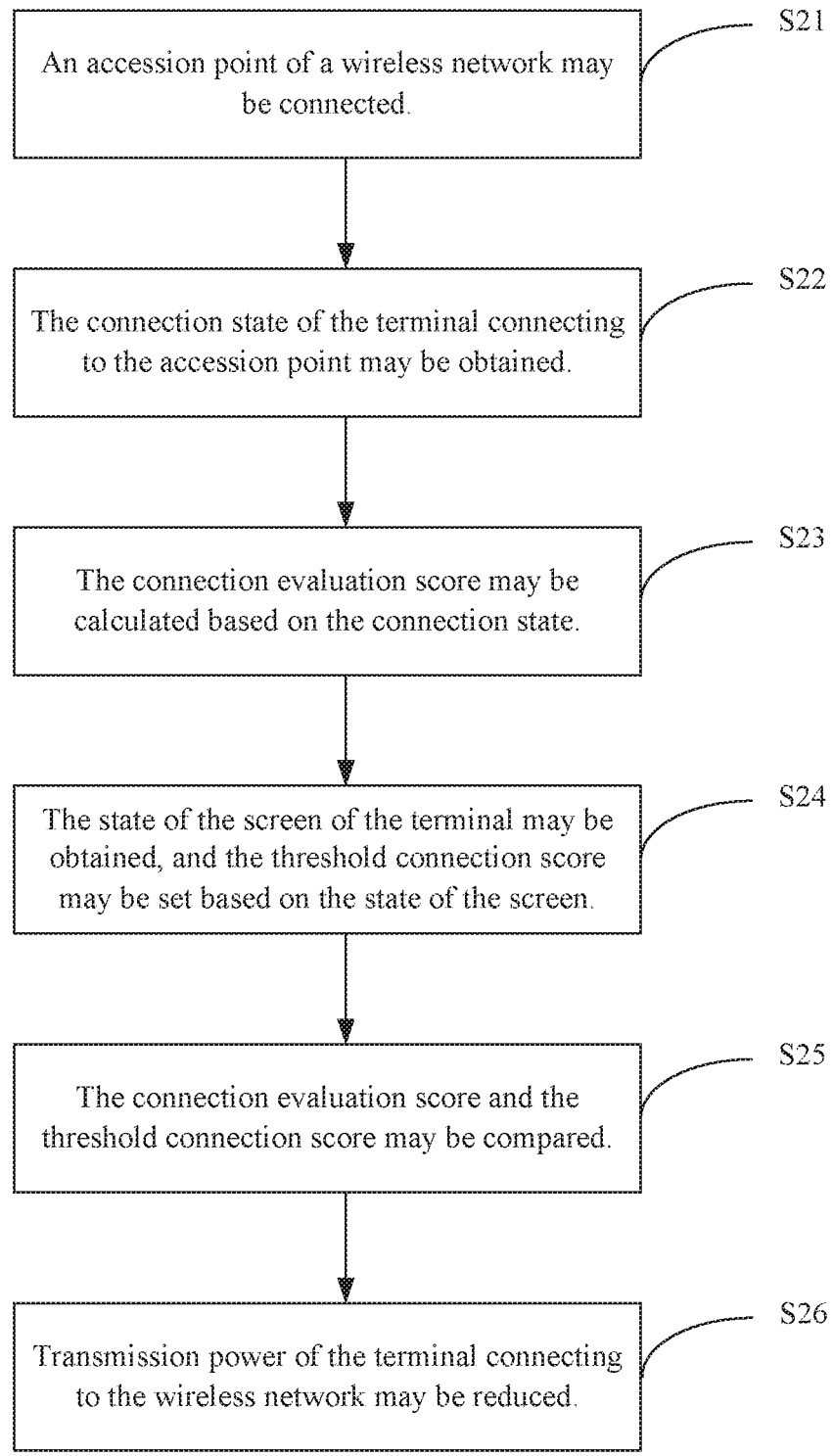
FIG. 2 is a flow chart showing a method of adjusting transmission power of terminal according to another embodiment of the present disclosure.

As shown in FIG. 2, a flow chart showing a method of adjusting transmission power of terminal is provided. In the present embodiment, the method of adjusting transmission power of the terminal may include following operations.

In an operation of S21, an accession point of a wireless network may be connected to the terminal.

In the present embodiment, the accession point of the wireless network may be connected. Specifically, during the user is daily using the terminal, activities, such as working, entertaining, socializing, and the like, may be performed by accessing an internet. The internet may be accessed via the wireless network, such as 3G, 4G, or WiFi. In the operation of S21, the internet may be accessed via connection with WiFi, that is, a function of the terminal for connecting the WiFi may be activated (for example, a switch on the for WiFi connection on the terminal may be switched on), a list of WiFi accession points found by the terminal may be acquired, and an accession point expected for connection may be selected. The accession point of the wireless network connected in the operation of S11 may be used in a following operation S22 to obtain a connection state.

In the operation of S22, the connection state of the terminal connecting to the accession point may be obtained.

After performing the operation of S21, the accession point of the wireless network may be connected to the terminal, the operation of S22 may be performed, obtaining the connection state of the terminal connecting to the accession point. The connection state of the accession point may include attribute information of the accession point. The accession point may be analyzed accordingly by obtaining the connection state of the accession point. In the present embodiment, obtaining the connection state of the terminal connecting to the accession point may include obtaining a connection speed, a packet loss rate, and an interference degree of the terminal connecting to the accession point.

To obtain the interference degree of the terminal connecting to the accession point, a channel type of the accession point connected with the terminal may be obtained firstly, and signal strength values of all accession points in a channel related to the accession point connected with the terminal may be obtained. The interference degree may be obtained by calculating the signal strength values based on a computing strategy corresponding to the channel type. Specifically, a channel may refer to a pathway along which a signal transmits in a communication system, and may include a transmission medium through which the signal transmitted from a sender to a receiver. Channel types that the WiFi is currently using may include two types, a type of 2.4G and a type of 5.0G. In common frequency bands of the 2.4G and 5.0G, various countries may set various opening degrees for these two types of channels. For example, in Israel, a 2.4G-type channel may include 9 channels from 2.432G to 2.427G, and a 5.0G-type channel may include 8 channels from 5.12G to 5.35G. In China, the 2.4G-type channel may include 13 channels from 2.412G to 2.472G, and the 5.0G-type channel may include 4 channels from 5.725G to 5.82G. In the present embodiment, communication standards of China may be applied, that is, 13 channels in the type of the 2.4G and 4 channels in the type of 5.0G may be applied. In other embodiments, communication standards of other countries may be applied and will not be limited by the present disclosure. Typically, in a same channel type, interference may completely be avoided when signals transmitting along two channels with 4 channels apart from each other. A channel in the type of 2.4G may be surrounded by a plurality of interfering channels, whereas an interfering channel may not exist for a channel in the type of 5.0G. The interference degree of the terminal connecting to the accession point may be relative to a hotspot, which is in a same channel as the accession point connected to the terminal. That is, the more hot spots the same channel has, the higher the interference degree is. Therefore, the interference degree of the channel in the type of the 2.4G and that of the channel in the type of the 5.0G may be calculated based on different strategy formulas.

When the terminal is connected to an accession point in a first channel, and the first channel is in the type of 2.4G, signal strength values of all accession points in the first channel may be obtained. Further, signal strength values of all accession points in a second channel may be obtained, and the second channel is next to the first channel. Signal strength values of all accession points in a third channel may be obtained. Signal strength values of all accession points in a fourth channel may be obtained. The second channel is arranged between the first channel and the third channel. The second channel and the third channel are arranged between the first channel and the fourth channel. The interference degree may be calculated based on a first strategy formula, and the first strategy formula is shown as follows:

$$\Sigma_{i=1}^{4}(W_i \times \Sigma_{j=1}^{n_i} T_{ij})) \quad (1)$$

$T_{ij}$ may represent a ratio of a signal strength value of an accession point j of a channel i to a predefined experienced value. $W_i$ may represent a weight of the channel i, and $n_i$ may represent the number of accession numbers in the channel i. A weight $W_1$ of the first channel may be equal to 2, a weight $W_2$ of the second channel may be equal to 1.5, a weight $W_3$ of the third channel may be equal to 1, and a weight $W_4$ of the fourth channel may be equal to 0.5.

Specifically, a plurality of hot spots may be included in one channel, and the accession point connected to the terminal may refer to a certain hotspot of a certain channel. Other hot spots in a same channel (i.e., the certain channel) may generate interference to the accession points, and weights of interference degrees generated by hot spots in other channels may progressively, decrease. That is, the weight of the same channel (i.e., the certain channel) may be 2, the weight of a channel being one channel away from the certain channel may be 1.5, the weight of a channel being two channels away from the certain channel may be 1, the weight of a channel being three channels away from the certain channel may be 0.5, and the weight of a channel being four or more channels away from the certain channel may be 0, that is, no interference may be generated by the channel being four or more channels away from the certain channel. The predefined experience value in a formula (2) may be set based on a chip of the terminal. For example, when the chip arranged in the terminal is provided by MTK (MediaTek. Inc, Taiwan), the predefined experience value may be equal to −50, and when the chip arranged in the terminal is provided by Qualcomm, the predefined experience value may be equal to −60. The predefined experience value may be stored in the terminal during the terminal is being set in a factory, and may be extracted while calculating the interference degree. However, when the predefined experience value of the chip arranged in the terminal is unable to be extracted while calculating the interference degree, a default predefined experience value of −50 may be used. In the present embodiment, the predefined experience value may be −50.

For example, the terminal may connect to a hotspot A in Channel 6, and a type of Channel 6 is 2.4G. Channel 6 may further include a hotspot B6 and a hotspot C6. Signal strength of the hotspot B6 may be RSSIB6, and signal strength of the hotspot C6 may be RSSIC6. RSSIB6 and RSSIC6 may both be −80 dbm. Channel 7 may be arranged next to Channel 6 and include a hotspot A7 and a hotspot B7. Signal strength of the hotspot A7 may be RSSIA7, and signal strength of the hotspot B7 may be RSSIB7. RSSIA7 and RSSIB7 may both be −70 dbm. Channel 8 may include a hotspot A8 and a hotspot B8. Signal strength of the hotspot A8 may be RSSIA8, and signal strength of the hotspot B8 may be RSSIB8. RSSIA8 and RSSIB8 may both be −60 dbm. Channel 7 may be arranged between Channel 6 and Channel 8. Channel 9 may include a hotspot A9 and a hotspot B9. Signal strength of the hotspot A9 may be RSSIA9, and signal strength of the hotspot B9 may be RSSIB9. RSSIA9 and RSSIB9 may both be −50 dbm. Channel 7 and Channel 8 may be arranged between Channel 6 and Channel 9. According to formula (1) and (2), interference degrees of the above mentioned channels may be calculated.

An interference degree of Channel 6 may be 2×(RSSIB6/N+RSSIC6/N).

An interference degree of Channel 7 may be 1.5×(RSSIA7/N+RSSIB7/N).

An interference degree of Channel 8 may be 1×(RSSIA8/N+RSSIB8/N).

An interference degree of Channel 9 may be 0.5×(RSSIA9/N+RSSIB9/N).

An interference degree of the hotspot A in Channel 6 may be equal to a sum the interference degree of Channel 6, the interference degree of Channel 7, the interference degree of Channel 8, and the interference degree of Channel 9, and that is, 2×((−80 dbm)−(−50)+(−80 dbm)/(−50))+((−70 dbm)−(−50)+(−70 dbm)/(−50))+1×((−60 dbm)−(−50)+(−60 dbm)/(−50))+0.5×((−50 dbm)−(−50)+(−50 dbm)/(−50)). Therefore, the interference degree of the hotspot A in Channel 6 may be equal to 14 dbm.

When the channel having the accession point connected to the terminal is in the type of 5G, signal strength of all accession points in the channel may further be obtained, and the interference degree may be calculated based on a second strategy formula. The second strategy formula may be shown as follows.

$$W \times \Sigma_{j=1}^{n} T_j \quad (2)$$

$T_j$ may represent a ratio of signal strength of an accession point j in the channel having the accession point connected to the terminal to the predefined experience value. W may represent a weight of the channel having the accession point of the terminal n may represent the number of accession points in the channel having the accession point of the terminal. As an interfering channel is virtually nonexistent for the channel in the type of 5G, the interference degree may be relative to hot spots in a same channel (i.e., the channel having the accession point connected to the terminal) only, and the weight W of the channel having the accession point of the terminal may be equal to 2.

For example, the terminal may be connected to a hotspot A in Channel 1, and Channel 1 may be in the type of 5G. Channel 1 may further include a hotspot B1 and a hotspot C1. Signal strength of the hotspot B1 may be RSSIB1, and signal strength of the hotspot C1 may be RSSIC1. RSSIB1 may be equal to −75 dbm, RSSIC1 may be equal to −65 dbm, and the predefined experience value may be equal to −50. The interference degree of Channel 1 may be equal to be 2×((−75 dbm)/(−50)+(−65 dbm)/(−50)), and that is 2.66 dbm.

The connection state obtained in the operation of S22 may be used in a following operation of S23 to calculate a connection evaluation score.

In the operation of S23, the connection evaluation score may be calculated based on the connection state.

In the operation of S23, the connection evaluation score may be calculated based on the connection state obtained in the operation of S22. Specifically, the connection evaluation score may be used to evaluate a current state of the accession point. A formula to calculate the connection evaluation score may be expressed as: the connection evaluation score=the speed of connection×/(the packet loss rate×0.2+the interference degree×0.1). According to the formula, a higher speed of connection of the terminal may indicate a better quality of a communication link between the terminal and the accession point. A higher packet loss rate may indicate greater communication capacity, and reducing the transmission power of the terminal may be inappropriate. It may also be inappropriate to reduce the transmission power of the terminal in response to a high interference degree. Therefore, the higher the loss rate and the interference degree are, the lower quality the connection state is in, and the lower a corresponding connection evaluation score is; the higher the connection speed is, the better the connection state is, and the higher the corresponding connection evaluation score is.

In the present embodiment, after the connection evaluation score is calculated, a following operation of S24 may be performed, that is, a state of a screen of the terminal may be obtained, and a threshold connection score may be set based on the state of the screen. In a following operation of S25, the connection evaluation score calculated in the operation of S23 may be used to compare to the threshold connection score set in the operation of S24.

In the operation of S24, the state of the screen of the terminal may be obtained, and the threshold connection score may be set based on the state of the screen.

After performing the operation of S23, the connection evaluation score is calculated based on the connection state, the state of the screen of the terminal may be obtained in the operation of S24, and the threshold connection score corresponding to the state of the screen may be set. Specifically, the state of the screen of the terminal may impact the connection state of the terminal. For example, when the screen is in black, the terminal may be determined to be unused by the user. Connection to the internet while the screen is in black is to prevent from missing reminding messages sent by applications. A connection state of at least maintaining the connection and a relatively low transmission speed may be required to enable the user to fluently use the terminal. Therefore, a first threshold connection score may be set for the screen in black. When the screen is bright, the terminal may be determined as being used by the user, such as watching videos, socializing, and the like. A connection state of relatively high signal strength and a relatively high transmission speed may be required to enable the user to use the terminal fluently. Therefore, a second threshold connection score may be set for the bright screen. Based on a usage state of the terminal, the connection state between the unused terminal and the accession point may be weaker than that between the terminal in use and the accession point. That is, the first threshold connection score may be less than the second threshold connection score.

In the operation of S24, the threshold connection score set based on the state of the screen may be used in the following operation of S25 to compare to the connection evaluation scores obtained in the operation of S23.

In the operation of S25, the connection evaluation score and the threshold connection score may be compared.

In the operation of S25, the calculated connection evaluation score obtained in the operation of S23 may be compared to the threshold connection score set based on the state of the screen in the operation of S24. That is, when the screen is in black, the connection evaluation score may be compared to the first threshold connection score corresponding to the black screen, and when the screen is bright, the connection evaluation score may be compared to the second threshold connection score corresponding to the bright screen. In response to the connection evaluation score being greater than the threshold connection score corresponding to the state of the screen, an operation of S26 may be performed. In response to the connection evaluation score being less than the threshold connection score corresponding to the state of the screen, no operations may further be performed.

In the operation of S26, transmission power of the terminal connecting to the wireless network may be reduced.

In the operation of S25, after determining the connection evaluation score being greater than the threshold connection score, the transmission power of the terminal may be reduced in the operation of S26. The transmission power of the terminal connecting to the wireless network may be reduced in a stepwise manner or by reducing a same value periodically. For example, a stepwise reduction may refer to reducing 5 db each time in a first stage, reducing 1 db each time in a second stage, and reducing 0.1 db each time in a third stage. Reducing a same value periodically may refer to reducing 5 db every 5 seconds. In the present embodiment, the transmission power of the terminal connecting to the wireless network may refer to reducing 0.5 db each time.

It may be noted that, in the present embodiment, the operations of S22 to S26 may be performed repeatedly. That is, after each reduction of the transmission power of the terminal connecting to the wireless network as described in the operation of S26, the operations of S22 to S25 may be performed again. That is, the connection evaluation score obtained after reducing the transmission power may be compared to the threshold connection score again. In response to the connection evaluation score being greater than the threshold connection score, the operation of S26 may be performed again, and no operation may further be performed until the connection evaluation score is less than or equal to the threshold connection score.

According to the present embodiment, the accession point of the wireless network may be connected to the terminal, the connection state of the terminal connecting to the accession point may be obtained, the connection evaluation score may be calculated based on the connection state, the state of the screen of the terminal may be obtained, the threshold connection score may be set based on the state of the screen, and the connection evaluation score and the threshold connection score may be compared. In response to the connection evaluation score being greater than the threshold connection score, transmission power of the terminal connecting to the wireless network may be reduced. In such a way, the transmission power of WiFi may be adjusted dynamically based on the usage state of the terminal. The internet accession via WiFi may be maintained, and at the same time, the user may use the terminal to access the internet via the wireless network for an extended period of time with limited battery capacity, improving user experience.

The above-mentioned method may be performed by a mobile terminal, and a logic process may be expressed by a computer program and may be achieved via the mobile terminal.

Figure 3:
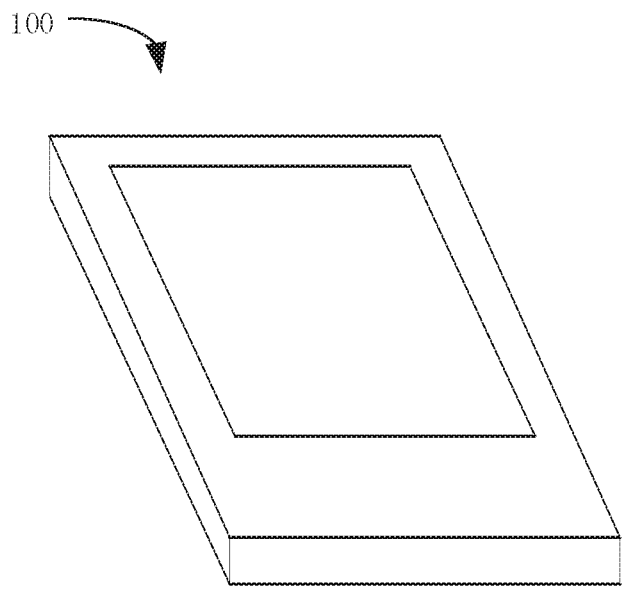
FIG. 3 is a structural diagram of a non-transitory storage device according to an embodiment of the present disclosure.

When the computer program is achieved in a form of software and sold or used as an independent product, the computer program may be stored in an electronic device-readable non-transitory storage medium. That is, a non-transitory storage device may be provided by the present disclosure. Tenon-transitory storage device may store program data, and the program data may be executed by a processor to perform the above-mentioned method to adjust transmission power of the non-transitory storage device connecting to the wireless network. As shown in FIG. 3, a structural diagram of a non-transitory storage device is provided. The non-transitory storage device 100 may store program data, and the program data may be executed to perform the method as described in the above embodiments. The non-transitory storage device may be a universal serial bus flash disk, an optical disk, a server, and the like.

Figure 4:
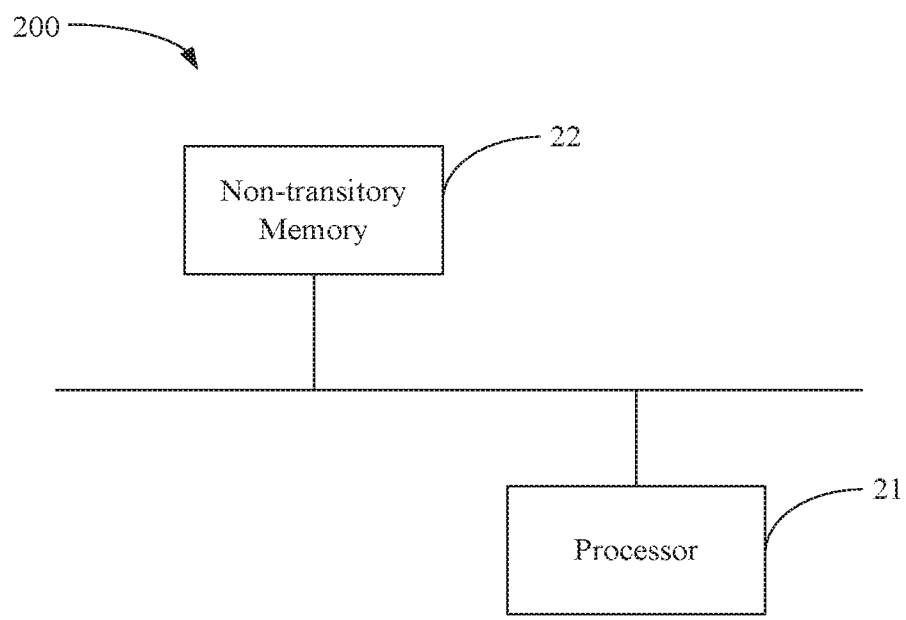
FIG. 4 is a structural diagram of a mobile terminal according to an embodiment of the present disclosure.

Hardware structures of the mobile terminal may be shown in FIG. 4. According to FIG. 4, a structural diagram of a mobile terminal is provided. The mobile terminal 200 in the present embodiment may include a processor 21 and a non-transitory memory 22. The processor 21 may be coupled with the non-transitory memory 22. The non-transitory memory 22 may store program data, and the processor 21 may upload and execute the program data to perform the above-mentioned method of adjusting transmission power of the terminal.

Specifically, the processor 21 may be arranged to connect to the accession point of the wireless network, obtain the connection state of the terminal connecting to the accession point, calculate the connection evaluation score based on the connection state, obtain the state of the screen of the terminal, set the threshold connection score based on the state of the screen, compare the connection evaluation score and the threshold connection score, and reduce the transmission power of the terminal connecting to the wireless network in response to the connection evaluation score being greater than the threshold connection score.

The method of adjusting the transmission power of the terminal achieved by the mobile terminal in the present embodiment may be similar to the implementation of the above-mentioned embodiments. Specific operations may refer to FIG. 1 or FIG. 2, and will not be repeatedly described hereinafter.

According to the mobile terminal in the present embodiment, the user may be enabled to use the mobile terminal to access the Internet via the wireless network for an extended period of time with limited battery capacity, improving user experience.

The above description includes implementations of the present disclosure only, but does not limit the scope of the present disclosure. Any equivalent structural or principal modification performed based on the description and the drawings of the present disclosure, applied directly or indirectly in other related art, should be within the scope of the present disclosure.

What is claimed is:

1. A non-transitory storage device, configured to store program data, the program data able to be executed by a processor to perform operations of:

connecting a terminal to an accession point of a wireless network;

obtaining a connection state of the terminal connecting to the accession point;

calculating a connection evaluation score based on the connection state;

obtaining a state of a screen of the terminal, setting a threshold connection score based on the state of the screen;

comparing the connection evaluation score to the threshold connection score; and reducing transmission power of the terminal connecting to the wireless network in response to the connection evaluation score being greater than the threshold connection score;

wherein the obtaining the connection state of the terminal connecting to the accession point comprises: obtaining a connection speed, a packet loss rate, and an interference degree of the terminal connecting to the accession point;

the calculating the connection evaluation score based on the connection state comprises: calculating the connection evaluation score based on a score calculation formula, and the score calculation formula is expressed as: the connection evaluation score=a connection speed×0.7/(the loss rate×0.2+the interference degree×0.1); and obtaining the interference degree of the terminal connecting to the accession point comprises:

obtaining a channel type of the accession point connected to the terminal and signal strength values of all accession points of a channel having the accession point connected to the terminal; and the interference degree is obtained by calculating the signal strength values based on a computing strategy corresponding to the channel type.

2. The non-transitory storage device according to claim 1, wherein the channel type is 2.4G, and while obtaining the interference degree of the terminal connecting to the accession point, the program data is further able to be executed by the processor to perform operations of:

obtaining signal strength values of all accession points of a first channel, wherein the accession point connected to the terminal is in the first channel;

obtaining signal strength values of all accession points in a second channel, signal strength values of all accession points in a third channel, and signal strength values of all accession points in a fourth channel, wherein the second channel is next to the first channel, the second channel is arranged between the first channel and the third channel, and the second channel and the third channel are arranged between the first channel and the fourth channel; and calculating the interference degree based on a first strategy formula shown as follows:

$$\Sigma_{i=1}^{4}(W_i \times \Sigma_{j=1}^{n_i} T_{ij})) \quad (1)$$

wherein $T_{ij}$ represents a ratio of a signal strength value of an accession point j in a channel i to a predefined experience value, $W_i$ represents a weight of the channel i, and $n_i$ represents the number of accession points in the channel i.

3. The non-transitory storage device according to claim 2, wherein a weight of the first channel ($W_1$) is equal to 2, a weight of the second channel ($W_2$) is equal to 1.5, a weight of the third channel ($W_3$) is equal to 1, and a weight of the fourth channel ($W_4$) is equal to 0.5.

4. The non-transitory storage device according to claim 1, wherein the channel type is 5G, and while obtaining the interference degree of the terminal connecting to the accession point, the program data is further able to be executed by the processor to perform operations of:
obtaining signal strength values of all accession points in a channel having the accession point connected to the terminal;
calculating the interference degree based on a second strategy formula shown as follows:

$$W \times \Sigma_{j=1}^{n} T_j \quad (2);$$

wherein $T_j$ represents a ratio of a signal strength value of an accession point j in the channel having the accession point connected to the terminal to a predefined experience value, W represents a weight of the channel having the accession point connected to the terminal, and n represents the number of accession points in the channel having the accession point connected to the terminal.

5. The non-transitory storage device according to claim 1, wherein while setting the threshold connection score based on the state of the screen, the program data is further able to be executed by the processor to perform operations of:
setting a first threshold connection score in response to the screen being in black; and
setting a second threshold connection score in response to the screen being bright;
wherein the first threshold connection score is less than the second threshold connection score.

6. The non-transitory storage device according to claim 1, wherein while reducing transmission power of the terminal connecting to the wireless network, the program data is further able to be executed by the processor to perform operations of:
reducing the transmission power of the terminal connecting to the wireless network by 0.5 db each time.

7. A method of adjusting transmission power of a terminal performed by the terminal, comprising:
connecting to an accession point of a wireless network;
obtaining a connection state of the terminal connecting to the accession point;
calculating a connection evaluation score based on the connection state;
obtaining a state of a screen, setting a threshold connection score based on the state of the screen;
comparing the connection evaluation score to the threshold connection score; and
reducing the transmission power of the terminal connecting to the wireless network in response to the connection evaluation score being greater than the threshold connection score.

8. The method according to claim 7, wherein
the obtaining the connection state of the terminal connecting to the accession point comprises obtaining a connection speed, a packet loss rate, and an interference degree of the terminal connecting to the accession point;
the calculating the connection evaluation score based on the connection state comprises calculating the connection evaluation score based on a score calculation formula, and the score calculation formula is expressed as: the connection evaluation score=the connection speed×0.7/(the loss rate×0.2+the interference degree×0.1).

9. The method according to claim 8, wherein the obtaining the interference degree of the terminal connecting to the accession point comprises:
obtaining a channel type of the accession point connected to the terminal and signal strength values of all accession points in a channel relative to the accession point connected to the terminal; and
obtaining the interference degree by calculating the signal strength values based on a computing strategy corresponding to the channel type.

10. The method according to claim 9, wherein the channel type is 2.4G, and the obtaining the interference degree of the terminal connecting to the accession point comprises:
obtaining signal strength values of all accession points in a first channel, wherein the accession point connected to the terminal is in the first channel;
obtaining signal strength values of all accession points in a second channel, signal strength values of all accession points in a third channel, and signal strength values of all accession points in a fourth channel, wherein the second channel is next to the first channel, the second channel is between the first channel and the third channel, and the second channel and the third channel are arranged between the first channel and the fourth channel; and
calculating the interference degree based on a first strategy formula shown as follows:

$$\Sigma_{i=1}^{4}(W_i \times \Sigma_{j=1}^{n_i} T_{ij})) \quad (1)$$

wherein $T_{ij}$ represents a ratio of a signal strength value of an accession point j in a channel i to a predefined experience value, $W_i$ represents a weight of the channel i, and $n_i$ represents the number of accession points in the channel i.

11. The method according to claim 10, wherein a weight of the first channel ($W_1$) is equal to 2, a weight of the second channel ($W_2$) is equal to 1.5, a weight of the third channel ($W_3$) is equal to 1, and a weight of the fourth channel ($W_4$) is equal to 0.5.

12. The method according to claim 9, wherein the channel type is 5G, and the obtaining the interference degree of the terminal connecting to the accession point comprises:
obtaining signal strength values of all accession points in a channel having the accession point connected to the terminal;
calculating the interference degree based on a second strategy formula shown as follows:

$$W\Sigma_{j=1}^{n} T_j \quad (2);$$

wherein $T_j$ represents a ratio of a signal strength value of an accession point j in the channel having the accession point connected to the terminal to a predefined experience value, W represents a weight of the channel having the accession point connected to the terminal, and n represents the number of accession points in the channel having the accession point connected to the terminal.

13. The method according to claim 7, wherein the setting the threshold connection score based on the state of the screen comprises:
setting a first threshold connection score in response to the screen being in black;
setting a second threshold connection score in response to the screen being bright; and
the first threshold connection score is less than the second threshold connection score.

14. The method according to claim 7, wherein the reducing transmission power of the terminal connecting to the wireless network comprises:
reducing the transmission power of the terminal connecting to the wireless network by 0.5 db each time.

15. A mobile terminal, comprising a processor and a non-transitory memory, wherein the processor is coupled with the non-transitory memory, and the processor is arranged to perform operations of:
connecting to an accession point of a wireless network;
obtaining a connection state of the terminal connecting to the accession point;
calculating a connection evaluation score based on the connection state;
obtaining a state of a screen, setting a threshold connection score based on the state of the screen;
comparing the connection evaluation score to the threshold connection score; and
reducing the transmission power of the terminal connecting to the wireless network in response to the connection evaluation score being greater than the threshold connection score.

16. The mobile terminal according to claim 15, wherein while obtaining a connection state of the terminal connecting to the accession point, the processor is further arranged to perform operations of:
obtaining a connection speed, a packet loss rate, and an interference degree of the terminal connecting to the accession point; and
the calculating the connection evaluation score based on the connection state comprises calculating the connection evaluation score based on a score calculation formula, and the score calculation formula is expressed as: the connection evaluation score=the connection speed×0.7/(the loss rate×0.2+the interference degree×0.1).

17. The mobile terminal according to claim 16, wherein while obtaining the interference degree of the terminal connecting to the accession point, the processor is further arranged to perform operations of:
obtaining a channel type of the accession point connected to the terminal and signal strength values of all accession points in a channel relative to the accession point connected to the terminal; and
obtaining the interference degree by calculating the signal strength values based on a computing strategy corresponding to the channel type.

18. The mobile terminal according to claim 17, wherein the channel type is 2.4G, and while obtaining the interference degree of the terminal connecting to the accession point, the processor is further arranged to perform operations of:
obtaining signal strength values of all accession points in a first channel, wherein the accession point connected to the terminal is in the first channel;
obtaining signal strength values of all accession points in a second channel, signal strength values of all accession points in a third channel, and signal strength values of all accession points in a fourth channel, wherein the second channel is next to the first channel, the second channel is between the first channel and the third channel, and the second channel and the third channel are arranged between the first channel and the fourth channel; and
calculating the interference degree based on a first strategy formula shown as follows:

$$\Sigma_{i=1}^{4}(W_i \times \Sigma_{j=1}^{n_i} T_{ij})) \qquad (1)$$

wherein $T_{ij}$ represents a ratio of a signal strength value of an accession point j in a channel i to a predefined experience value, $W_i$ represents a weight of the channel i, and $n_i$ represents the number of accession points in the channel i.

19. The mobile terminal according to claim 18, wherein a weight of the first channel ($W_1$) is equal to 2, a weight of the second channel ($W_2$) is equal to 1.5, a weight of the third channel ($W_3$) is equal to 1, and a weight of the fourth channel ($W_4$) is equal to 0.5.

20. The mobile terminal according to claim 17, wherein the channel type is 5G, and while obtaining the interference degree of the terminal connecting to the accession point, the processor is further arranged to perform operations of:
obtaining signal strength values of all accession points in a channel having the accession point connected to the terminal;
calculating the interference degree based on a second strategy formula shown as follows:

$$W \times \Sigma_{j=1}^{n} T_j \qquad (2);$$

wherein $T_j$ represents a ratio of a signal strength value of an accession point j in the channel having the accession point connected to the terminal to a predefined experience value, W represents a weight of the channel having the accession point connected to the terminal, and n represents the number of accession points in the channel having the accession point connected to the terminal.

* * * * *